United States Patent [19]
Modh et al.

[11] Patent Number: 6,067,085
[45] Date of Patent: May 23, 2000

[54] METHOD AND APPARATUS FOR DISPLAYING A CURSOR ON A DISPLAY

[75] Inventors: Manish Modh; Donald Alan James, both of Round Rock, Tex.

[73] Assignee: International Business Machines Corp., Armonk, N.Y.

[21] Appl. No.: 08/908,549

[22] Filed: Aug. 8, 1997

[51] Int. Cl.[7] .................................................. G06F 3/14
[52] U.S. Cl. ....................... 345/339; 345/145; 345/336; 345/977
[58] Field of Search .................... 345/160, 145, 345/339, 347, 336, 338, 157, 973, 964

[56] References Cited

U.S. PATENT DOCUMENTS

| | | | |
|---|---|---|---|
| 4,259,725 | 3/1981 | Andrews et al. | 364/521 |
| 4,521,772 | 6/1985 | Lyon | 340/710 |
| 4,521,773 | 6/1985 | Lyon | 340/710 |
| 4,698,625 | 10/1987 | McCaskill et al. | 345/157 |
| 4,833,462 | 5/1989 | Gover et al. | 340/709 |
| 4,984,152 | 1/1991 | Muller | 345/333 |
| 5,055,831 | 10/1991 | Padula | 340/706 |
| 5,420,976 | 5/1995 | Schell et al. | 345/352 |
| 5,473,343 | 12/1995 | Kimmich et al. | 345/145 |
| 5,504,917 | 4/1996 | Austin | 395/800 |
| 5,510,811 | 4/1996 | Tobey et al. | 345/157 |
| 5,511,157 | 4/1996 | Wang | 345/437 |
| 5,550,967 | 8/1996 | Brewer et al. | 345/336 |
| 5,596,699 | 1/1997 | Driskell | 345/352 |
| 5,655,093 | 8/1997 | Frid-Nielsen | 345/326 |

FOREIGN PATENT DOCUMENTS

| | | | |
|---|---|---|---|
| 5-73256 | 3/1993 | Japan | 3/14 |
| 8-202520 | 8/1996 | Japan | 3/14 |

OTHER PUBLICATIONS

Using Netscape 2, 2$^{nd}$ edition, Copyright 1995 by Mark R. Brown Special Edition.

*IBM Technical Disclosure Bulletin*, Cursor–Tracking Highlighter, vol. 39, No. 10, Oct. 1996, pp. 211–213.

*IBM Technical Disclosure Bulletin*, Animated Cursor Pointer, vol. 34, No. 12, May 1992, pp. 209–210.

*Primary Examiner*—Raymond J. Bayerl
*Assistant Examiner*—Cuong T. Thai
*Attorney, Agent, or Firm*—Duke W. Yee; Jeffrey S. LaBaw

[57] ABSTRACT

A method and apparatus for providing visual cues on a display within a data processing system. An animated cross hair having a center that coincides with the cursor hot spot is displayed, wherein attention of a viewer of the animated cross hair is drawn to the cursor hot spot by the animated cross hair.

28 Claims, 8 Drawing Sheets

METHOD AND APPARATUS FOR DISPLAYING A CURSOR ON A DISPLAY

BACKGROUND OF THE INVENTION

1. Technical Field

The present invention relates generally to an improved data processing system in particular to a method and apparatus for manipulating data in a data processing system. Still more particularly, the present invention relates to a method and apparatus for displaying a cursor on a display in a data processing system.

2. Description of the Related Art

The manipulation of data in a data processing system is well known in the prior art. Data may be manipulated in many ways in a modern state-of-the-art data processing system including: data accessing, data encoding, data communications, data compression, data conversion, data entry, data exchange, data filing, data linking, data locking, data manipulation, data mapping, data modeling, data processing, data recording, data sorting, and data transferring. The large amounts of data that are available to the user of modern state-of-the-art data processing system often become overwhelming in magnitude and complexity. These situations may often arise in the creation and execution of multimedia presentations.

Data processing systems are capable of communicating information to users in many formats, including: text, graphics, sounds, animated graphics, synthesized speech, and video. Multimedia presentations employ a data processing system to combine such information formats into a coherent and comprehensive presentation to the user.

As is known in the art, a cursor on a computer screen can be used to input commands into a computer. The cursor contains a hot spot that indicates the location of the cursor itself. A user can input commands to move the cursor on the screen, thus moving the hot spot, by using keyboard arrow keys or a pointing device such as a mouse or trackball. The term "mouse," when used in this document, refers to any type of operating system supported graphical pointing device including, but not limited to: a mouse, track ball, touch pad, light pin, touch screen, and the like. A pointing device is typically employed by a user of the data processing system to interact with the data processing system's GUI. A "pointer", also called a "cursor", is an iconic image controlled by a mouse or other such device, and is displayed on the video display device of a data processing system to visually indicate to the user icons, menus, or other types of graphical objects that may be selected or manipulated.

By moving the cursor and placing the hot spot on a particular portion of the screen, commands can be entered into the computer. For example, a computer may have a software program which includes pull-down menus. By placing the hot spot of the cursor on a pull-down menu and actuating or "clicking" a switch or button, a menu is displayed on the screen from which a user may enter commands. Similarly, by placing the hot spot of the cursor on an icon, file name, menu selection, or other object on the screen and clicking the button, a command can be entered to open or act upon a file or application program that is represented by the icon, file name, menu selection or other object. This method of command selection is commonly known as "point and click", and is commonly performed using computer pointing devices such as mice or trackballs. Overall, the point and click method of command selection allows users to more easily operate computers.

A user, however, may have difficulty locating the cursor on certain computer screens. For example, high resolution cathode ray tube ("CRT") type screens are able to display a great amount of visual data or detail. The cursor may be difficult to visually locate on high resolution CRT screens because the cursor may be lost among various other objects concurrently displayed, particularly when the cursor is stationary on the screen. Additionally, many portable computers use liquid crystal type displays ("LCD") because LCDs are small, lightweight, and use little power. LCDs, however, have a slow response time between a user's input and a visual feedback to the user on the screen indicating movement of the cursor. Low lighting or insufficient screen contrast on LCDs make it difficult to locate the cursor on these screens. Furthermore, as the size of the computer screens grow, a user's ability to rapidly locate the cursor on the screen, without moving the cursor, becomes more difficult.

Additionally, cursors typically have a "hot spot" that marks the exact screen location that is affected by a mouse action. With currently available cursors, however, such as an arrow, it is often difficult for a user to determine where the "hot spot" is located. As a result, a user may have to employ multiple "clicks" or actuations of a button on the mouse in order to cause the desired action on the display screen.

Therefore, it would be advantageous to have an improved method and apparatus for displaying a cursor within a data processing system. It is also would be advantageous to have an improved method and apparatus for drawing a user's attention to a hot spot of a cursor.

SUMMARY OF THE INVENTION

It is one object of the present invention to provide an improved data processing system.

It is another object of the present invention to provide a method and apparatus for manipulating data in a data processing system.

It is yet another object of the present invention to provide a method and apparatus for displaying a cursor on a display in a data processing system.

It is still yet another object of the present invention to provide a method and apparatus for helping a user identify where a hot spot is located.

The foregoing objects are achieved as is now described. The present invention provides a method and apparatus for providing visual cues on a display within a data processing system. A hot spot is provided. An animated cross hair having a center that coincides with the hot spot is displayed, wherein attention of a viewer of the animated cross hair is drawn to the hot spot by the animated cross hair.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
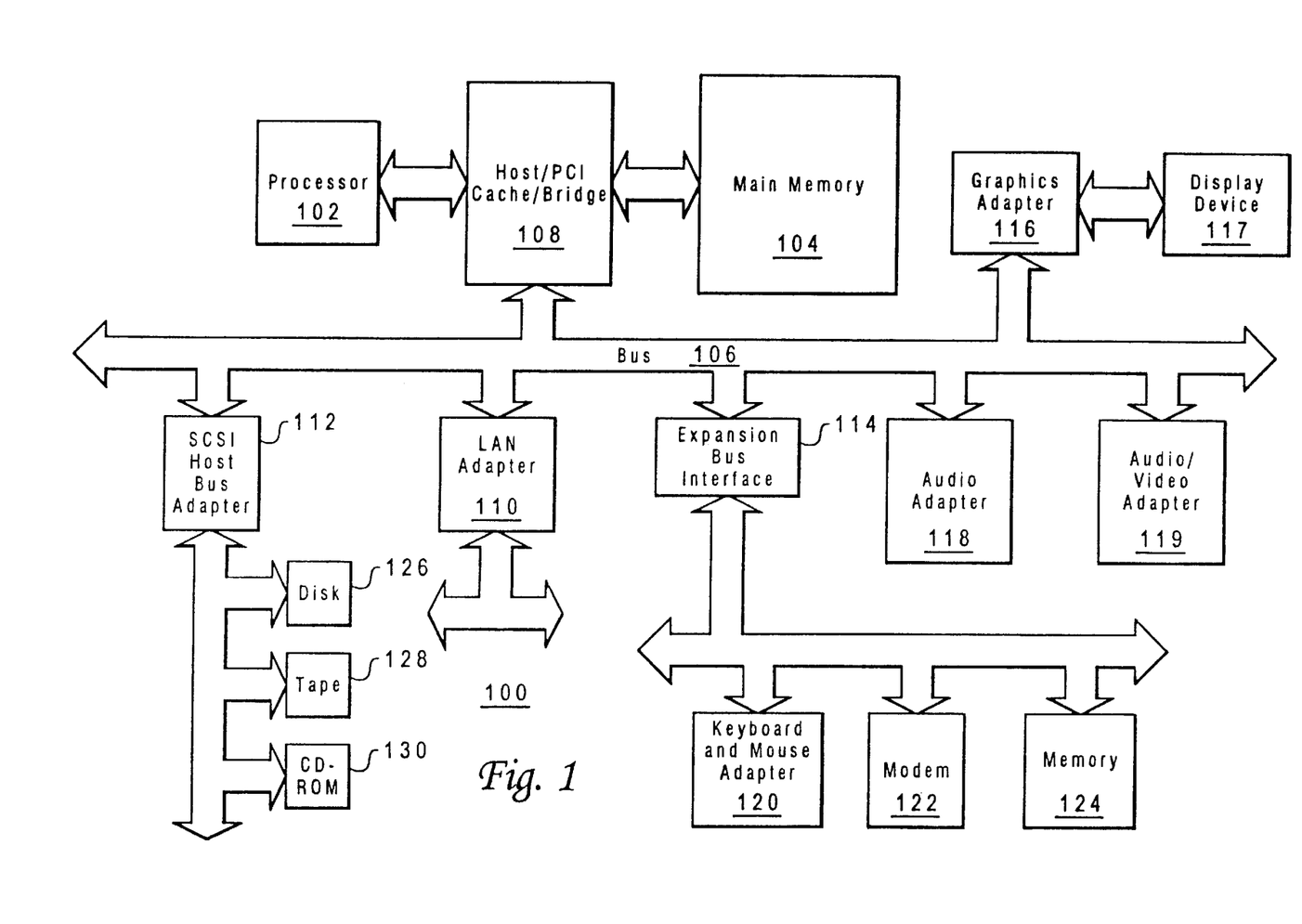
FIG. 1 is a block diagram of a data processing system in the present invention may be implemented.

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Graphics adapter 118 is connected to display device 117, which may be, for example, a monitor or a television. Expansion bus interface 114 provides a connection for a keyboard and mouse adapter 120, modem 122, and additional memory 124. SCSI host bus adapter 112 provides a connection for hard disk drive 126, tape drive 128, and CD-ROM 130 in the depicted example. Typical PCI local bus implementations will support three or four PCI expansion slots or add-in connectors. The depicted example includes four loads on the mother board and three expansion slots. Those of ordinary skill in the art will appreciate that the hardware in FIG. 1 may vary. For example, other peripheral devices, such as optical disk drives and the like may be used in addition to or in place of the hardware depicted in FIG. 1. The depicted example is not meant to imply architectural limitations with respect to the present invention.

The present invention provides animation to draw the user's attention to the cursor and to the hot spot of the cursor in particular. A "hot spot" is the portion of a cursor that marks the exact screen location that will be affected by a mouse action such as a depression of a button. Typically, a "hot spot" is only a single pixel in size and only represents a small portion of the cursor. The present invention draws a user's or viewer's attention to the hot spot through animation of a cross hair that is part of the cursor.

In accordance with the preferred embodiment of the present invention, the cursor includes two concentric circles over a cross hair. The animation has the radial lines of the cross hairs start at the outer portion of the concentric circles and progress to the center, which is the hot spot of the cursor.

Figure 2A:
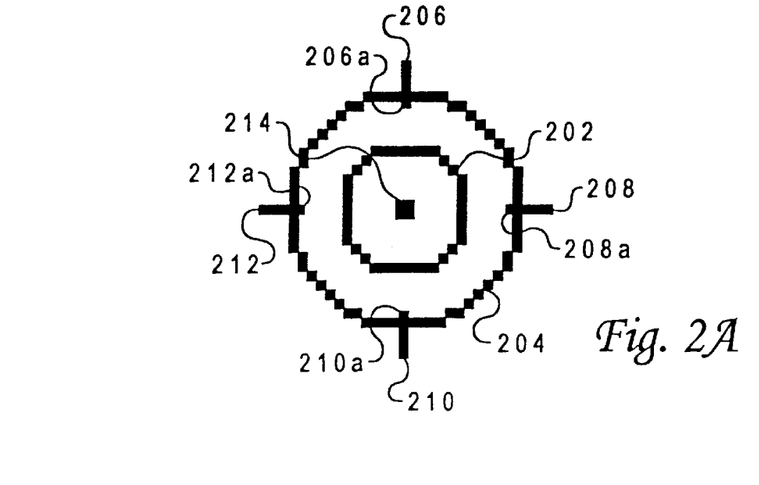
FIGS. 2A–2F are illustrations of a cursor in accordance with a preferred embodiment of the present invention.

With reference now to FIGS. 2A–2F, illustrations of a cursor are displayed in accordance with a preferred embodiment of the present invention. FIGS. 2A–2F are frames of a normal cursor that may be manipulated using a mouse in a more efficient manner by a user in part due to the animation illustrated in these figures. Turning first to FIG. 2A, cursor 200 contains a geometric shape that consists of two concentric circles, circles 202 and 204. Additionally, cursor 200 includes a cross hair in the form of lines 206, 208, 210, and 212. Additionally, cursor 200 includes a hot spot 214. Lines 206, 208, 210, and 212 begin at the outer portion of the geometric shape and in particular along circle 204. In the depicted example, lines 206, 208, 210, and 212 have a color that is the inverse of the background color.

Figure 2B:
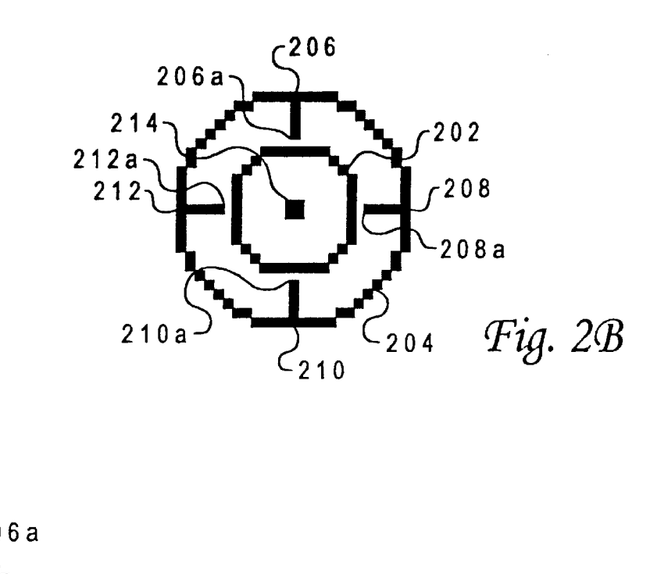
Figure 2C:
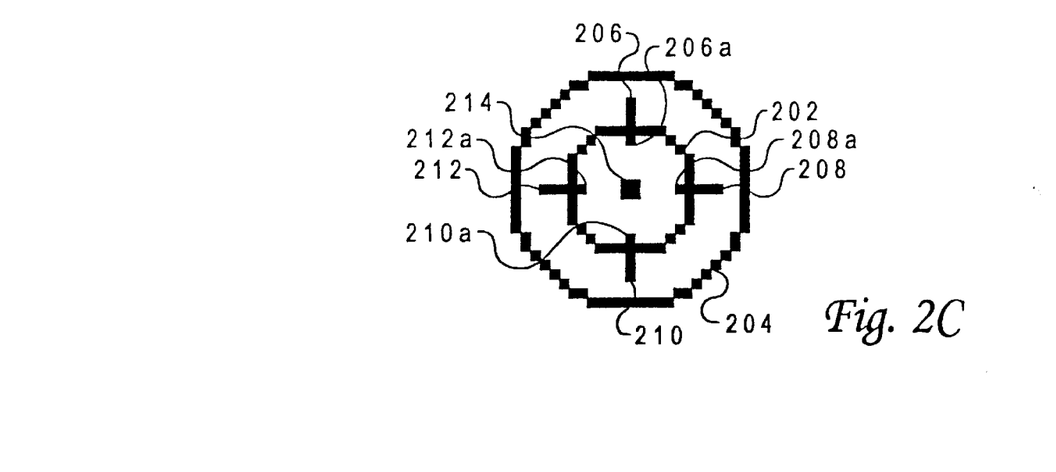

Animation is provided for the lines making up the cross hair to draw a user's attention to hot spot 214. In particular, terminating ends 206a, 208a, 210a, and 212a of lines 206, 208, 210, and 212 begin at a selected distance from hot spot 214. In FIG. 2B, lines 206, 208, 210, and 212 have been redisplayed along with circles 202 and 204 in which the selected distance of terminating ends 206a, 208a, 210a, and 212a from hot spot 214 has decreased.

Figure 2D:
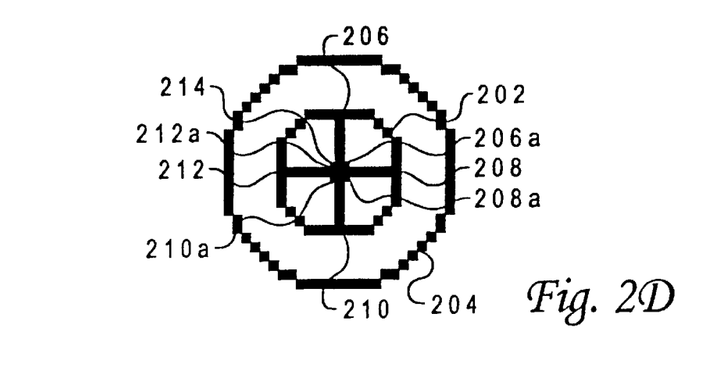
Figure 2E:
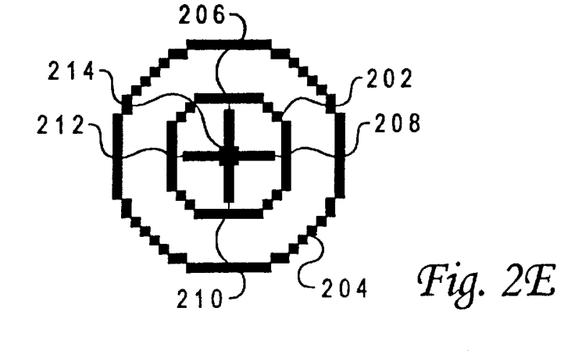
Figure 2F:
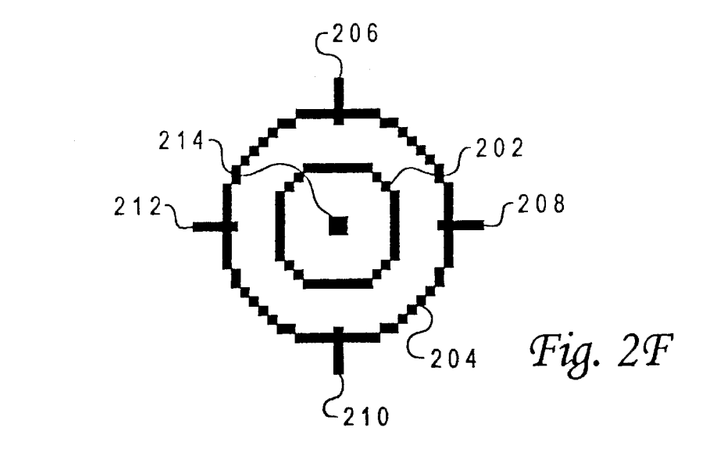

Additionally, hot spot 214 may blink. This animation of the cross hair continues in FIGS. 2C and 2D. In FIG. 2D, terminating ends 206a, 208a, 210a, and 212a have reached hot spot 214. In FIG. 2E, lines 206, 208, 210, and 212 decrease in length. Finally, in FIG. 2F, lines 206, 208, 210, and 212 have disappeared leaving only hot spot 214 and circles 202 and 204 in cursor 2F.

Figure 3:
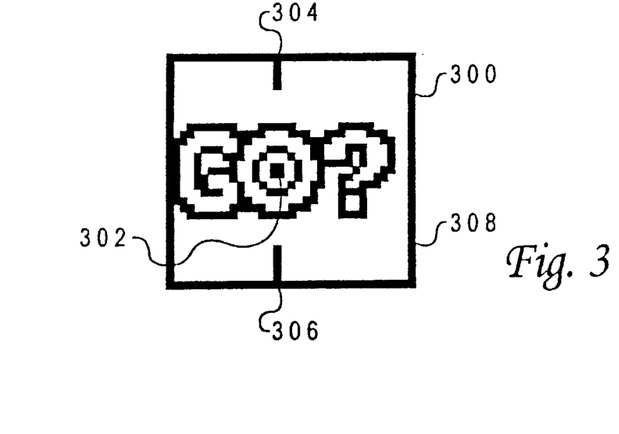
FIG. 3 is an illustration of a cursor over an active area of a display screen in accordance with the preferred embodiment of the present invention.

Turning next to FIG. 3, an illustration of a cursor over an active area of a display screen in accordance with the preferred embodiment of the present invention. The active areas of a display screen is an area that may be selected by a cursor to initiate an action. For example, an icon representing a folder or a selected word or graphical object on a web page may provide an active area, also referred to as a "clickable action area". One known cursor used to indicate an active area of a display-screen is a hand cursor, which is a cursor in the form of a graphical hand.

In FIG. 3, a Go cursor is displayed to indicate an active area. Cursor 300 is a Go cursor which includes a hot spot 302 and lines 304 and 306 displayed with geometric shape 308. This cursor may be displayed in place of cursor 200 in response to hot spot 214 in cursor 200 being moved over an active area on the display screen. Cursor 300 is employed to indicate that an action may be taken using the mouse. Additionally, cursor 300 may blink over the active area on the display screen. Alternatively, if the hot spot is blinking, cursor 300 may blink at the same rate and in the same color as the hot spot.

With reference now to FIGS. 4A–4F, illustrations of a wait cursor are displayed in accordance with the preferred embodiment of the present invention. A wait cursor is displayed in response to an occurrence of an action taken by the data processing system that precludes a user from making a selection with the mouse.

Figure 4A:
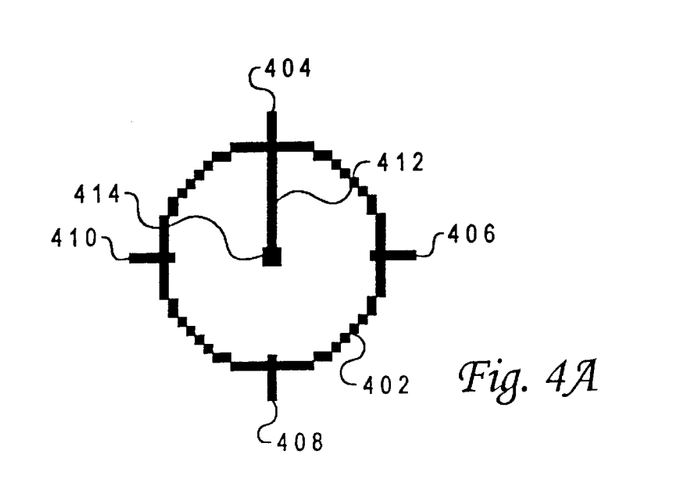
FIGS. 4A–4F are illustrations of a wait cursor in accordance with the preferred embodiment of the present invention.
Figure 4B:
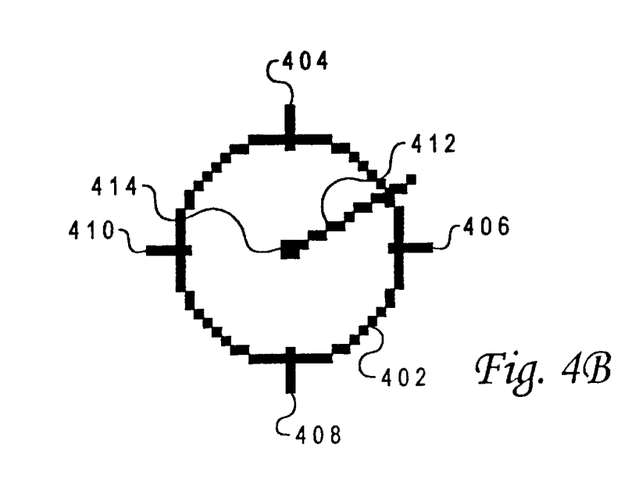
Figure 4C:
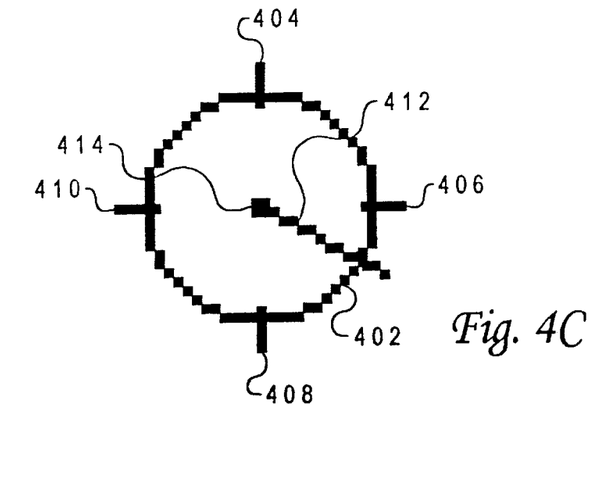
Figure 4D:
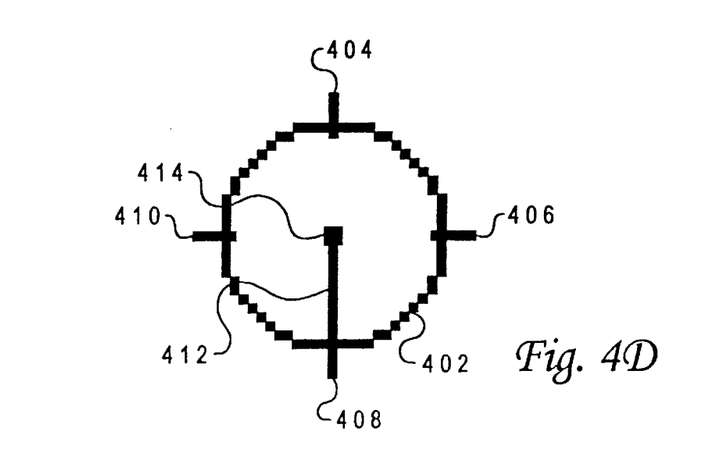
Figure 4E:
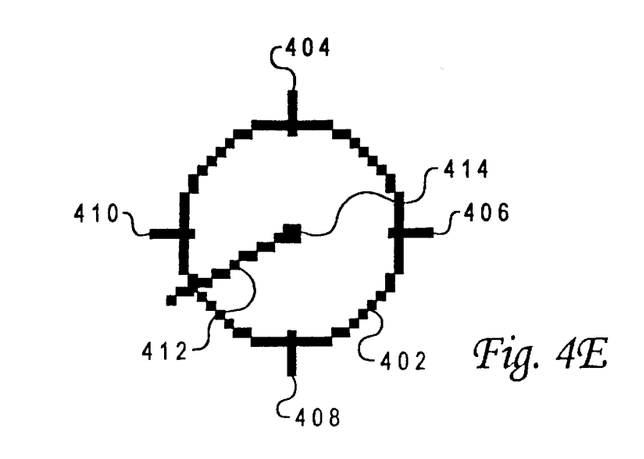
Figure 4F:
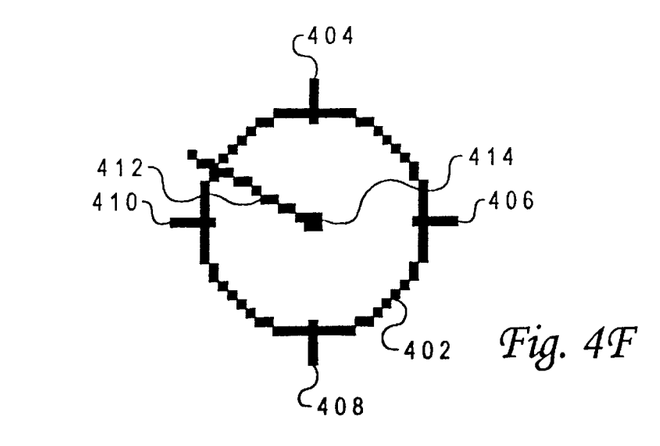
Figure 5A:
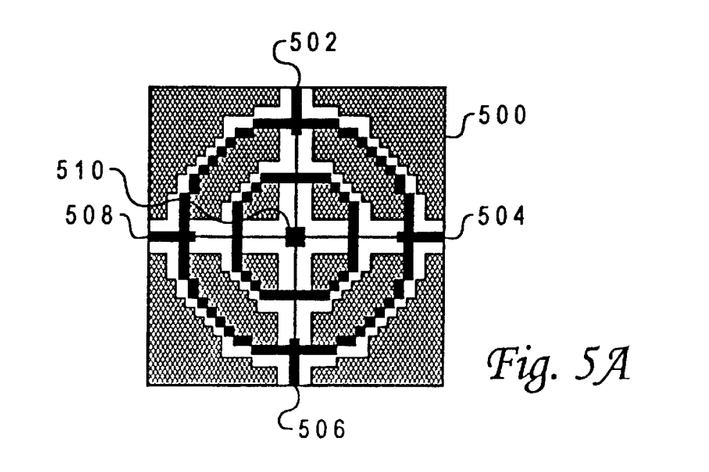
FIGS. 5A–5F are illustrations of a cursor in accordance with a preferred embodiment of the present invention.
Figure 5B:
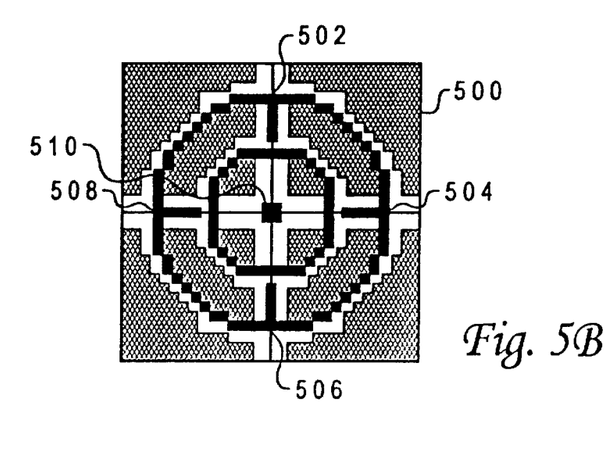
Figure 5C:
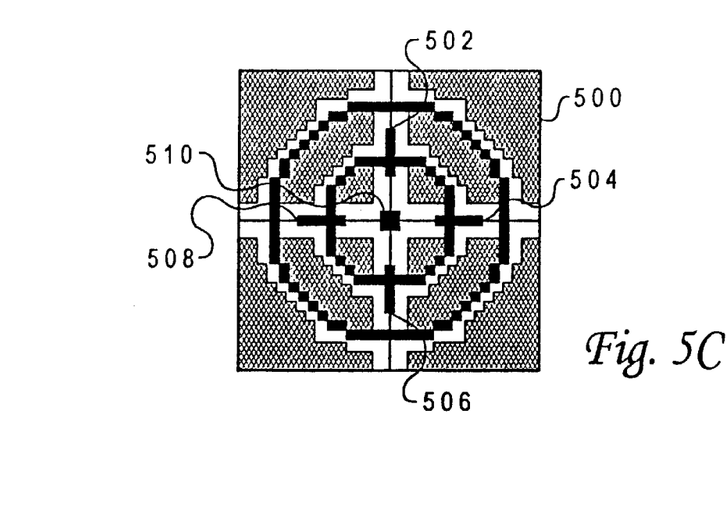
Figure 5D:
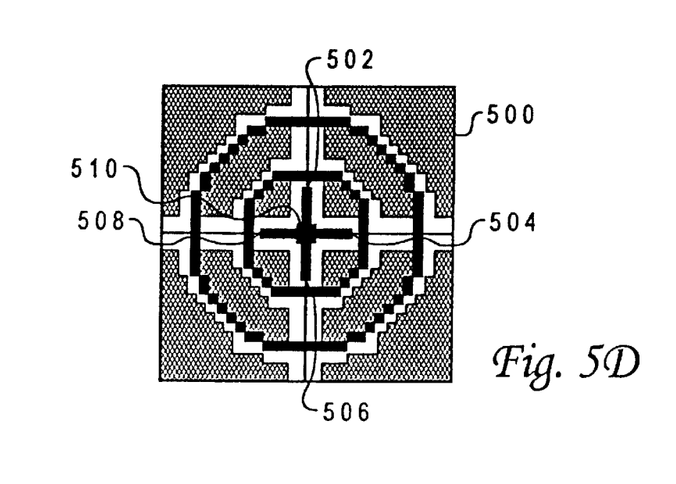
Figure 5E:
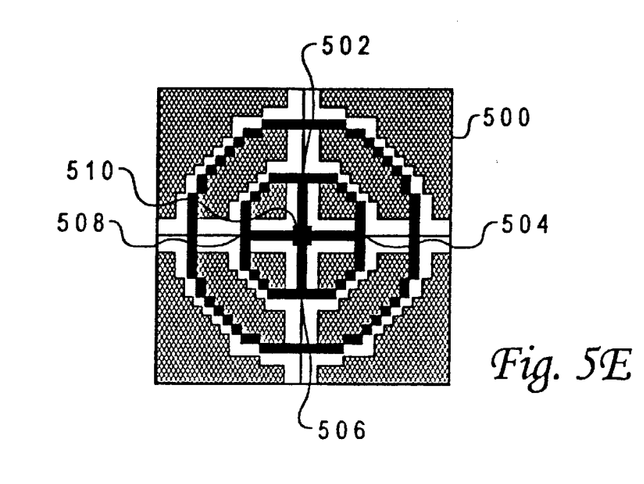
Figure 5F:
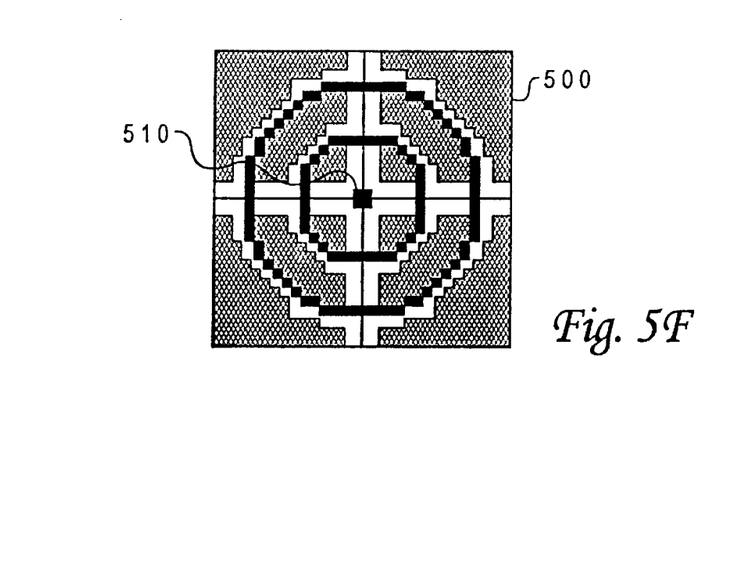

Turning first to FIG. 4A, cursor 400 is similar to cursor 200 in that it includes a geometric shape with a cross hair. Cursor 400, however, contains only a single circle 402 in the geometric shape and lines 404, 406, 408, and 410, making up the cross hair of cursor 400, are not animated. Cursor 400 also contains an animated clock hand 412 having one end beginning at hot spot 414 and a second end terminating outside of circle 402. This animated clock hand moves in a clockwise fashion around the geometric shape as can be seen in FIGS. 4A–4F.

With reference to FIGS. 5A–5F, illustrations of a cursor are depicted in accordance with a preferred embodiment of the present invention. FIGS. 5A–5F, like FIGS. 2A–2F, are frames of a normal cursor that may be manipulated using a mouse in a more efficient manner due to the animation illustrated in these figures. Cursor 500 includes a geometric shape and a cross hair, like cursor 200 above. Additionally, cursor 500 includes segments 502–508, which start at the outer portion of the geometric shape. These segments move along the cross hair towards hot spot 510 as can be seen in the progression of frames from FIG. 5A to FIG. 5F. In the depicted example, segments 502–508 have a different color from the cross hair. Attention is drawn to hot spot 510 as segments 502–508 move inward towards hot spot 510.

Those of ordinary skill in the art will realize that other geometric shapes may be used in place of the concentric circles in FIGS. 2A–2F and in FIGS. 5A–5F. For example, a single circle or an N sided polygon (with N greater than or equal to three) may be used. Additionally, animation may occur in the geometric shape. For example, the concentric circles may decrease in size towards the hot spot to draw a user's or viewer's attention to the hot spot. Furthermore, different colors may be used depending on the application.

Figure 6:
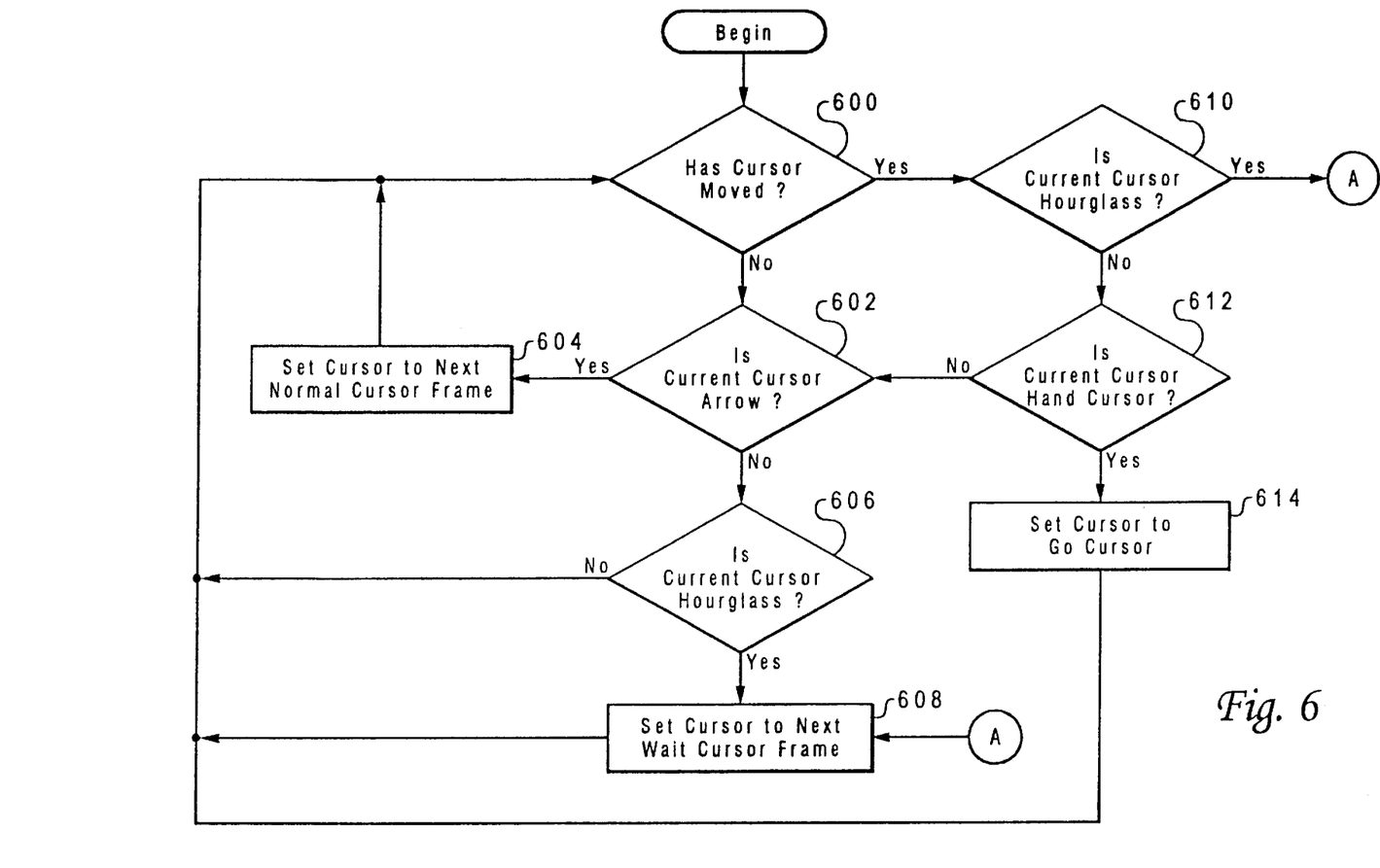
FIG. 6 is a flowchart of a process for displaying cursors on a display screen in accordance with the preferred embodiment of the present invention.

Turning now to FIG. 6, a flowchart of a process for displaying cursors on a display screen is depicted in accordance with the preferred embodiment of the present invention. FIG. 6 is a flowchart illustrating how the normal cross hair cursor, the wait cursor and the Go cursor may be displayed in place of an arrow cursor, an hourglass cursor, and a hand cursor, respectively. The process begins by determining whether the cursor has moved (step 600). If the cursor has not moved, the process then determines whether the current cursor being displayed is a arrow cursor (step 602). If the current cursor is an arrow cursor, the process then displays the next cursor frame by setting the cursor to the next normal cursor frame (step 604). With reference again to step 602, if the current cursor is not an arrow cursor, the process then determines whether the current cursor is an hourglass (step 606). If the current cursor is not an hourglass, the process returns to step 600. Otherwise, the process then sets the cursor to the next wait cursor frame (step 608). With reference again to step 600, if the cursor has moved, the process then determines whether the current cursor is an hourglass cursor (step 610) if the current cursor is an hourglass cursor, the process proceeds to step 608 as previously described. Otherwise, the process determines whether the current cursor is a hand cursor (step 612). If the process determines that the current cursor is a hand cursor, the process sets the cursor equal to the Go cursor (step 614) with the process then returning to step 600. Animation is provided as the process loops through steps 600, 602, and 604, steps 600, 610, and 608; and steps 600, 602, 606, and 608.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include: recordable-type media such a floppy discs and CD-ROMs and transmission-type media such as digital and analog communications links.

The description of the preferred embodiment of the present invention has been presented for purposes of illustration and description, but is not limited to be exhaustive or limited to the invention in the form disclosed. Many modifications and variations will be apparent to those of ordinary skill in the art. That the embodiment was chosen and described in order to best explain the principles of the invention the practical application to enable others of ordinary skill in the art to understand the invention for various embodiments with various modifications as are suited to the particular use contemplated.

What is claimed is:

1. A method in a data processing system for displaying a cursor within a data processing system, the method comprising:

displaying a cross hair cursor having a center that coincides with a hot spot, wherein the cross hair cursor comprises a plurality of lines radiating from the center; and animating the cross hair cursor.

2. The method of claim 1, wherein the step of animating the cross hair cursor further comprises:

repeatedly displaying the plurality of lines such that the plurality of lines move radially towards the center.

3. The method of claim 1, wherein the step of animating the cross hair cursor further comprises:

repeatedly displaying the plurality of lines such that each line within the plurality of lines includes a segment that moves along the line towards the center.

4. The method of claim 3, wherein the segment has a different color from the line associated with the segment.

5. The method of claim 3, wherein the segment has a different intensity from the line associated with the segment.

6. The method of claim 1, wherein the cross hair cursor further comprises:

a variably-sized geometric shape having a center that coincides with the hot spot.

7. The method of claim 6, wherein the step of animating the cross hair cursor comprises:

repeatedly redisplaying the geometric shape of decreasing size each time the geometric shape is redisplayed.

8. The method of claim 6, wherein the geometric shape is a circle, and wherein the step of animating the cross hair cursor comprises repeatedly redisplaying the circle with a decreasing radius each time the circle is redisplayed.

9. A method in a data processing system for providing visual cues on a display within the data processing system, the method comprising:

displaying a geometric shape on the display, wherein the geometric shape has a center that coincides with a cursor hot spot;

displaying a plurality of lines placed radially about the center, wherein each of the plurality of lines has a beginning end located within the geometric shape and a terminating end located a selected distance from the center; and redisplaying repeatedly the geometric shape and the plurality of lines, wherein the selected distance of each terminating end from the center decreases each time the geometric shape and the plurality of lines is redisplayed.

10. The method of claim 9, wherein the plurality of lines comprises four lines configured as a cross hair with a center that coincides with the cursor hot spot.

11. A method in a data processing system for providing visual cues on a display within the data processing system, the method comprising:

providing a hot spot;

displaying a geometric shape on the display, wherein the geometric shape has a center that coincides with the hot spot, and wherein the geometric shape comprises two rings, a first ring having a first radius beginning at the center and a second ring having a second radius beginning at the center, wherein the first radius is larger than the second radius;

displaying a plurality of lines, wherein each of the plurality of lines has a beginning end located within the geometric shape and a terminating end located a selected distance from the center; and redisplaying the geometric shape and the plurality of lines, wherein the selected distance of each terminating end from the center decreases each time the geometric shape and the plurality of lines is redisplayed.

12. The method of claim 10, wherein the display includes a background color and wherein the plurality of lines are displayed in a color that is an inverse of the background color.

13. The method of claim 9 further comprising:

ceasing redisplaying the geometric shape and the plurality of lines in response to the cursor hot spot being located over an active area within the display; and displaying a Go cursor in response to the ceasing step.

14. A method in a data processing system for providing visual cues on a display within the data processing system, the method comprising:

providing a hot spot;

displaying a geometric shape on the display, wherein the geometric shape has a center that coincides with the hot spot;

displaying a plurality of lines, wherein each of the plurality of lines has a beginning end located within the geometric shape and a terminating end located a selected distance from the center;

redisplaying the geometric shape and the plurality of lines, wherein the selected distance of each terminating end from the center decreases each time the geometric shape and the plurality of lines is redisplayed;

ceasing redisplaying the geometric shape and the plurality of lines in response to an occurrence of an action temporarily precluding user input;

displaying, in place of the geometric shape, a second geometric shape, wherein the second geometric shape has a center both that coincides with the hot spot; and displaying an animated clock hand having one end beginning at the hot spot and a second end terminating outside the circle.

15. A method in a data processing system for displaying a cursor on a display within the data processing system, the method comprising:

displaying a geometric shape on the display device, wherein the geometric shape has a center that coincides with an active portion of the cursor;

displaying a cross hair within the geometric shape, wherein the cross hair includes a plurality of lines located a selected median distance from the center; and altering the cross hair such that the plurality of lines have a progressively decreasing median distance from the center, wherein a visual indication of the active portion of the cursor is provided.

16. The method of claim 15, wherein the cross hair comprises four lines, wherein each of the four lines has a terminating end constituting the ends of the cross hair.

17. A method in a data processing system for displaying a cursor on a display within the data processing system, the method comprising:

displaying a geometric shape on the display device, wherein the geometric shape has a center that coincides with a portion of the cursor; and displaying repeatedly an animated cross hair, wherein the animated cross hair includes a plurality of lines placed radially about the center having a selected median distance from the center, the selected median distance decreasing each time the animated cross hair is displayed.

18. A data processing system for displaying a cursor on a display within the data processing system, the data processing system comprising:

means for displaying a cross hair cursor having a center that coincides with a hot spot, wherein the cross hair cursor comprises a plurality of lines radiating from the center; and means for animating the cross hair cursor.

19. A data processing system for providing visual cues on a display within the data processing system, the data processing system comprising:

first displaying means for displaying a geometric shape on the display, wherein the geometric shape has a center that coincides with a cursor hot spot;

second displaying means for displaying a plurality of lines placed radially about the center, wherein each of the plurality of lines has a beginning end located within the geometric shape and a terminating end located a selected distance from the center; and redisplaying means for redisplaying repeatedly the geometric shape and the plurality of lines, wherein the selected distance of each terminating end from the center decreases each time the geometric shape and the plurality of lines is redisplayed.

20. The data processing system of claim 19, wherein the plurality of lines comprises four lines configured as a cross hair with a center that coincides with the cursor hot spot.

21. A data processing system for providing visual cues on a display within the data processing system, the method comprising:

first displaying means for displaying a geometric shape on the display, wherein the geometric shape has a center that coincides with a hot spot, and wherein the geometric shape comprises two rings, a first ring having a first radius beginning at the center and a second ring having a second radius beginning at the center, wherein the first radius is larger than the second radius;

second displaying means for displaying a plurality of lines, wherein each of the plurality of lines has a beginning end located within the geometric shape and a terminating end located a selected distance from the center; and redisplaying means for redisplaying the geometric shape and the plurality of lines, wherein the selected distance of each terminating end from the center decreases each time the geometric shape and the plurality of lines is redisplayed.

22. The data processing system of claim 20, wherein the display includes a background color and wherein the plurality of lines are displayed in a color that is an inverse of the background color.

23. The data processing system of claim 19 further comprising:

means for ceasing redisplaying by the redisplaying means in response to the cursor hot spot being located over an active area within the display; and third display means for displaying a Go cursor in response to the ceasing step.

24. A data processing system for providing visual cues on a display within the data processing system, the method comprising:

first displaying means for displaying a geometric shape on the display, wherein the geometric shape has a center that coincides with a hot spot;

second displaying means for displaying a plurality of lines, wherein each of the plurality of lines has a beginning end located within the geometric shape and a terminating end located a selected distance from the center;

redisplaying means for redisplaying the geometric shape and the plurality of lines, wherein the selected distance of each terminating end from the center decreases each time the geometric shape and the plurality of lines is redisplayed;

means for ceasing redisplaying by the redisplaying means in response to an occurrence of an action temporarily precluding use input;

third display means for displaying, in place of the geometric shape, a second geometric shape, wherein the second geometric shape has a center both that coincides with the hot spot; and fourth display means for displaying an animated clock hand having one end beginning at the hot spot and a second end terminating outside the circle.

25. The data processing system of claim 24, wherein the fourth display means moves the animated clock hand in a clockwise fashion around the second geometric shape.

26. A data processing system for displaying a cursor on a display within the data processing system, the data processing system comprising:

first displaying means for displaying a geometric shape on the display device, wherein the geometric shape has a center that coincides with an active portion of the cursor;

second displaying means for displaying a cross hair within the geometric shape, wherein the cross hair includes a plurality of lines placed radially about the center located a selected median distance from the center; and alteration means for altering the cross hair such that the plurality of lines have a progressively decreasing median distance from the center, wherein a visual indication of the active portion of the cursor is provided.

27. The data processing system of claim 26, wherein the cross hair comprises four lines, wherein each of the four lines has a terminating end constituting the ends of the cross hair.

28. A computer program product for use with a data processing system for, the computer program product comprising:

a computer usable medium;

first instructions for providing a cursor hot spot;

second instructions for displaying a geometric shape on the display, wherein the geometric shape has a center that coincides with the cursor hot spot;

third instructions for displaying a plurality of lines placed radially about the center, wherein each of the plurality of lines has a beginning end located within the geometric shape and a terminating end located a selected distance from the center; and fourth instructions for redisplaying repeatedly the geometric shape and the plurality of lines, wherein the selected distance of each terminating end from the center decreases each time the geometric shape and the plurality of lines is redisplayed, wherein the instructions are embodied within the computer usable medium.

* * * * *